US008655511B2

(12) United States Patent
Revol et al.

(10) Patent No.: US 8,655,511 B2
(45) Date of Patent: Feb. 18, 2014

(54) METHOD AND SYSTEM FOR DETERMINING THE ATTITUDE OF AN AIRCRAFT BY MULTI-AXIS ACCELEROMETRIC MEASUREMENTS

(75) Inventors: Marc Revol, Upic (FR); Jacques Mandle, Saint Peray (FR); Alain Bibaut, Igny (FR); Jacques Coatantiec, Fauconnieres (FR)

(73) Assignee: Thales, Neuilly-sur-Seine (FR)

( * ) Notice: Subject to any disclaimer, the term of this patent is extended or adjusted under 35 U.S.C. 154(b) by 162 days.

(21) Appl. No.: 13/408,749

(22) Filed: Feb. 29, 2012

(65) Prior Publication Data

US 2012/0226395 A1 Sep. 6, 2012

(30) Foreign Application Priority Data

Mar. 3, 2011 (FR) ...................... 11 00643

(51) Int. Cl.
 *G05D 1/00* (2006.01)
(52) U.S. Cl.
 USPC ............ 701/4; 701/1; 701/2; 701/3; 701/500; 701/504
(58) Field of Classification Search
 USPC ............ 701/1–4, 500–504; 73/178, 505, 514, 73/517
 See application file for complete search history.

(56) References Cited

U.S. PATENT DOCUMENTS 4,106,094 A * 8/1978 Land .............................. 701/504
4,601,206 A 7/1986 Watson
6,473,676 B2 * 10/2002 Katz et al. ......................... 701/4
7,302,316 B2 * 11/2007 Beard et al. ..................... 701/11
2005/0150289 A1 7/2005 Osborne
2008/0269963 A1 * 10/2008 Vos et al. ........................... 701/4
2012/0136573 A1 * 5/2012 Janardhanan et al. ........ 701/512
2012/0166082 A1 * 6/2012 Fortier ........................... 701/504

FOREIGN PATENT DOCUMENTS

EP 0621482 A1 10/1994
FR 2107847 A1 5/1972

OTHER PUBLICATIONS

Institut National De La Profriete Industrielle, Preliminary Search Report, Feb. 14, 2012, Paris, France.
Ehad Akcila et al, Direct Gravity Estimation and Compensation in Strapdown INS Applications, 3rd International Conference onnSensing Technology, Nov. 30, 2008, Tainan, Taiwan.

* cited by examiner

*Primary Examiner* — James Trammell
*Assistant Examiner* — Majdi Alsomiri
(74) *Attorney, Agent, or Firm* — Michael J. Donohue; Davis Wright Tremaine LLP

(57) ABSTRACT

An inertial system measures the attitude of an aircraft consisting at least in determining the angle of pitch and/or the angle of heading and/or the angle of roll of the aircraft, each of the said angles of attitude being determined by successive double integration of their second derivative. A pair of accelerometers to determine the angle of pitch being are disposed on either side of the centre of gravity along an axis substantially merged with the longitudinal axis of the aircraft. A pair of accelerometers to determine the angle of heading are disposed on either side of the centre of gravity along an axis substantially merged with the transverse axis of the aircraft. A pair of accelerometers to determine the angle of roll are disposed on either side of the centre of gravity along a vertical axis perpendicular to the plane formed by the other axes.

20 Claims, 2 Drawing Sheets

METHOD AND SYSTEM FOR DETERMINING THE ATTITUDE OF AN AIRCRAFT BY MULTI-AXIS ACCELEROMETRIC MEASUREMENTS

FIELD OF THE INVENTION

The subject of the present invention is a method and a system for determining the attitude of an aircraft by multi-axis accelerometric measurements. The field of the invention is that of aerial navigation and relates to any type of aircraft, with or without a pilot.

The invention pertains in particular to the field of inertial navigation aid systems.

BACKGROUND OF THE INVENTION

The sensors which position an aircraft with respect to the air mass, called anemobaroclinometric sensors, deliver measurements that are fundamental for the aircraft and its safety. Conventionally, these measurements relate to four physical quantities: the total pressure, the static pressure, the temperature (total or static) and the angle of attack. On the basis of primary measurements such as these, elaborate navigation parameters are constructed such as for example, the conventional airspeed of the aircraft, the pressure altitude, the angle of attack or else the Mach number. In the absence of these parameters, the aeroplane cannot fly safely. All these parameters are processed by a central unit, generally redundant, of anemo-barometric type, which constitutes the operational or primary pathway making it possible to process all the information necessary for the navigation of the aircraft.

Having regard to the fundamental character of the anemo-barometric measurements for the safety of an aircraft, it is important to design a backup or secondary pathway, making it possible allowing to replace, where necessary, the operational pathway in case of failure of this one and/or making it possible to ensure control of the integrity of the measurements that it carries out.

The anemo-barometric facilities, which comprise notably Pitot probes coupled to static-pressure probes, exhibit the advantage of being able to provide a measurement of the modulus of the conventional airspeed of the aircraft directly. This item of information is critical for the piloting of the aircraft. Indeed, if this speed is too high, the aircraft may be damaged; if it is too low, it may stall and fall. By associating this measurement with an estimation (carried out for example by a magnetometer) of the heading, it is possible to determine the aircraft's airspeed vector. The real speed of displacement then results from compounding the airspeed of the aircraft with the mean wind speed.

To ensure that the information delivered by an anemo-barometric facility is secure, it is important to implement a backup system which must allow the attitude of the aircraft to be maintained when the operational system has failed. For this purpose, the usual backup systems implement schemes identical to those used by the operational pathway, that is to say those based on the use of Pitot probes and static-pressure probes.

Thus, the measurements carried out by the backup pathway are not independent of those delivered by the operational pathway since they are exposed to common failure modes.

To solve this problem, it is therefore appropriate to implement a backup system which uses different means of measurement from those of the operational pathway so as to ensure independent integrity control and to decrease the probability of simultaneous failure of the two pathways.

A solution to the aforementioned problem consists in using satellite radio-navigation signals, also called GNSS (Global Navigation Satellite System) signals, for measuring the course and attitude of the aircraft.

The applicant's French patent No. 01 16561 pertaining to a "method of improving the determination of the attitude of a vehicle with the aid of satellite radionavigation signals" describes the use of satellite radio-navigation signals for the measurement of carrier attitude and heading but restricted to the implementation of at least two antennas several wavelengths apart.

This solution exhibits the drawback of requiring at least two antennas and of increasing the bulk on the aircraft. Moreover it gives rise to difficulties of synchronization of the two antennas to which are also added problems regarding ambiguity in the phase measured on the basis of the two remote antennas.

A general limitation to the use of satellite radio-navigation signals for the aerial navigation resides in the vulnerability of satellite radio-navigation receivers in relation to the diverse disturbances related to the propagation environment, such as interference, multi-paths or jamming problems. These disturbances are liable to give rise to significant measurement biases, phase jumps or even dropouts of the phase tracking loops, thus rendering the service momentarily unavailable.

Another solution consists in using an inertial system conventionally composed of three accelerometers and three gyrometers for determining the three angles of attitude.

This solution exhibits a drawback in terms of equipment costs, related to the use of several gyrometers. Indeed the cost of a gyrometer, for example a laser gyrometer, is of the order of several hundred times the order of magnitude of the price of an accelerometer. Moreover a gyrometer is generally bigger than an accelerometer and consumes more energy than the latter, thereby giving rise, for a conventional inertial facility, to significant overall dimension.

In order to remove the limitations of the existing backup navigation solutions, the objective of the invention is to design an inertial system, allowing the calculation of the attitude of an aircraft, with low overall dimension and low-cost based mainly on the use of accelerometers.

An advantage of the invention resides in the replacement of all or part of the gyrometers of a conventional inertial facility by accelerometers with a view to producing a backup navigation system.

SUMMARY OF THE INVENTION

The subject of the invention is thus a method of determination, by an inertial system, of a measurement of the attitude of an aircraft characterized in that it consists at least in determining the angle of pitch $\theta$ and/or the angle of heading $\psi$ and/or the angle of roll $\phi$ of the said aircraft, each of the said angles of attitude being determined by successive double integration of their second derivative, the said second derivative being determined as the difference between the acceleration measurements delivered by two matched accelerometers, divided by the sum of the respective distances between the said accelerometers and the centre of gravity G of the said inertial system, the pair of accelerometers used for the determination of the angle of pitch $\theta$ being disposed on either side of the centre of gravity G along an axis x substantially merged with the longitudinal axis of the aircraft, the pair of accelerometers used for the determination of the angle of heading $\psi$ being disposed on either side of the centre of gravity G along an axis y substantially merged with the transverse axis of the aircraft, the pair of accelerometers used for the determination of the angle of roll φ being disposed on either side of the centre of gravity G along a vertical axis z perpendicular to the plane formed by the x and y axes.

In a variant embodiment, the method according to the invention furthermore consists in compensating for the errors of calibration of the said accelerometers by correcting the second derivative of the angle(s) of attitude θ, ψ, φ, by a differential bias $\overline{\Delta}_{x_{21}}$ divided by the sum of the respective distances between the accelerometers and the centre of gravity G of the said inertial system, the said differential bias $\overline{\Delta}_{x_{21}}$ being determined on the basis of the integration, over a given duration T, of the difference between on the one hand, the difference between the acceleration measurements delivered by the pair of matched accelerometers and on the other hand, an unbiased estimate of the second derivative of the angle of attitude θ, ψ, φ that multiplies the sum of the said distances.

In a variant embodiment of the invention, the measurement of the attitude of the aircraft is used as an item of backup information in support of a reference navigation system.

In a variant embodiment of the invention, the said reference navigation system delivers the unbiased estimate of the second derivative of the angle or angles of attitude.

In a variant embodiment, the method according to the invention furthermore consists in correcting the long-term drifts impacting the said attitude measurements by determining at least one compensation $\delta_\theta$ of the angle of pitch and/or one compensation $\delta_\phi$ of the angle of roll, the said compensations $\delta_\theta, \delta_\phi$ being determined on the basis of the comparison of the vector $\vec{B}$, orthogonal to the plane of the trim as defined by the angles of pitch θ and of roll φ and of the acceleration vector $\vec{g}$ of the aircraft subject to terrestrial gravity, the said vector $\vec{g}$ being determined as the gravimetric acceleration of the aircraft at its centre of gravity G, on the basis of the average of the acceleration measurements delivered by two matched accelerometers, the respective distances between two accelerometers of one and the same pair and the centre of gravity G of the said inertial system being fixed to be mutually equal.

In a variant embodiment, the method according to the invention furthermore consists in compensating the said acceleration vector $\vec{g}$ by an estimate $\vec{\gamma}_d$ of the dynamic acceleration of the aircraft.

The subject of the invention is also an inertial navigation system, on board an aircraft, characterized in that it comprises at least one pair of matched accelerometers disposed along an axis x substantially merged with the longitudinal axis of the said aircraft, on either side of the centre of gravity G of the said inertial system and at a respective distance $x_1, x_2$ from the latter, the sensitive axes of the said accelerometers being disposed substantially mutually parallel and perpendicular to the x axis, the said inertial system furthermore comprising calculation means linked to the said first pair and suitable for implementing the method for determining the angle of pitch θ of the said aircraft according to the invention.

In a variant embodiment, the inertial navigation system according to the invention furthermore comprises a second pair of matched accelerometers disposed along a vertical axis z perpendicular, at the point G, to the x axis, on either side of the said point G and at a respective distance $z_1, z_2$ from the latter, the sensitive axes of the said accelerometers being disposed substantially mutually parallel and perpendicular to the z axis, the said inertial system furthermore comprising calculation means linked to the said second pair and suitable for implementing the method for determining the angle of roll φ of the said aircraft according to the invention.

In a variant embodiment, the inertial navigation system according to the invention furthermore comprises a gyrometer disposed substantially at the point G and oriented according to a vertical axis z perpendicular, at the point G, to the x axis, the said gyrometer being suitable for delivering an estimate of the angle of heading ψ of the said aircraft.

In a variant embodiment, the inertial navigation system according to the invention furthermore comprises a third pair of matched accelerometers disposed along an axis y substantially merged with the transverse axis of the said aircraft and perpendicular at the point G, to the x axis, on either side of the said point G and at a respective distance $y_1, y_2$ from the latter, the sensitive axes of the said accelerometers being disposed substantially mutually parallel and perpendicular to the y axis, the said inertial system furthermore comprising calculation means linked at least to the said third pair and suitable for implementing the method for determining the angles of attitude of the said aircraft according to the invention.

In a variant embodiment, the inertial navigation system according to the invention constitutes a backup navigation system in support of a primary navigation system on board the said aircraft.

BRIEF DESCRIPTION OF THE DRAWINGS

Other characteristics and advantages of the invention will become apparent with the aid of the description which follows given with regard to the appended drawings which represent.

MORE DETAILED DESCRIPTION

Figure 1:
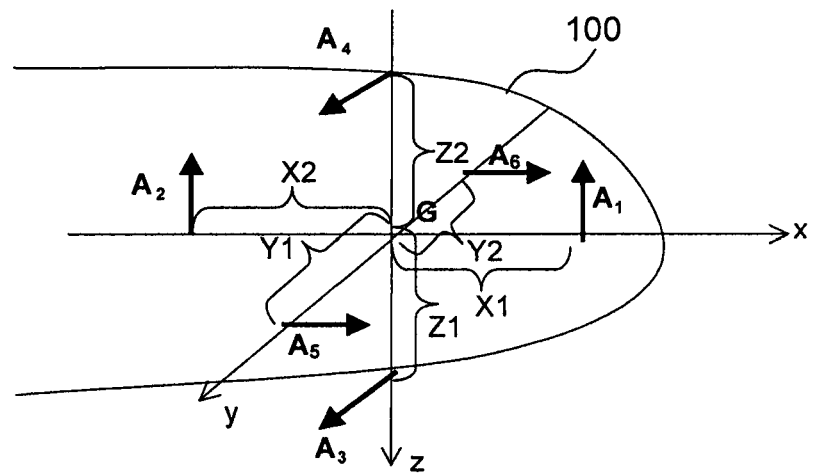
FIG. 1, a schematic diagrammatically showing the system according to the invention in a first embodiment, FIG. 2, a schematic diagrammatically showing the system according to the invention in a second embodiment.

FIG. 1 shows diagrammatically, in a schematic, the inertial system according to the invention in a first embodiment. The latter is composed of three pairs of mono-axis accelerometers (A1,A2), (A3,A4), (A5,A6) disposed on an aircraft 100 in a fixed reference frame {x,y,z} with respect to this aircraft. In FIG. 1, the six accelerometers are each represented by an arrow oriented in the direction of their respective sensitive axes, that is to say the direction in which the acceleration of the aircraft is measured. The x axis is substantially merged with the longitudinal axis of the aircraft 100, the y axis is substantially merged with the transverse axis of the aircraft 100 and the z axis is a vertical axis perpendicular to the plane formed by the y and z axes.

The point G represented in FIG. 1 is situated approximately at the centre of gravity of the inertial system according to the invention. The first pair of accelerometers (A1,A2) is disposed on either side of the point G along the axis x and at a distance from this point respectively equal to x1 and x2. The distance x1 represents the lever arm between the axis of the accelerometer A1 and the z axis of the reference frame. The distance x2 represents the lever arm between the axis of the accelerometer A2 and the z axis of the reference frame. The sensitive axes of the two matched accelerometers (A1,A2) are disposed parallel to one another and to the z axis. They are thus situated in the plane xGz, orthogonally to the x axis. The first pair of accelerometers (A1,A2) is used to determine the angle of pitch θ of the aircraft 100.

The second pair of accelerometers (A3,A4) is disposed on either side of the point G along the z axis and at a distance from this point respectively equal to z1 and z2. The sensitive axes of the two matched accelerometers (A3,A4) are disposed parallel to one another and to the y axis. They are thus situated in the plane yGz, orthogonally to the z axis. The second pair of accelerometers (A3,A4) is used to determine the angle of roll $\phi$ of the aircraft 100.

The third pair of accelerometers (A5,A6) is disposed on either side of the point G along the y axis and at a distance from this point respectively equal to y1 and y2. The sensitive axes of the two matched accelerometers (A5,A6) are disposed parallel to one another and to the x axis. They are thus situated in the plane xGy, orthogonally to the y axis. The third pair of accelerometers (A5,A6) is used to determine the angle of heading $\psi$ of the aircraft 100.

The acceleration measured respectively by the accelerometers A1 and A2 may be expressed with the aid of the following relations:

$$\gamma_{X_1} = \gamma_{d_z} - g \cdot \cos(\theta)\cos(\phi) - x_1 \cdot \ddot{\theta}$$

$$\gamma_{x_2} = \gamma_{d_z} - g \cdot \cos(\theta)\cos(\phi) + x_2 \cdot \ddot{\theta} \qquad (1)$$

$\theta$ is the angle of pitch of the aircraft 100,
$\phi$ is the angle of roll of the aircraft 100,
g represents the terrestrial gravity,
$\gamma_{d_z}$ represents the axial component, along the z axis, of the dynamic acceleration at the centre of gravity of the carrier,
$x_1$ is the value of the lever arm between the axis of the accelerometer A1 and the z axis,
$x_2$ is the value of the lever arm between the axis of the accelerometer A2 and the z axis.

On the basis of relations (1) is deduced an estimate of the second derivative of the angle of pitch as a function of the acceleration measurements delivered by the sensors A1 and A2 and of the lever arms $x_1$ and $x_2$.

$$\ddot{\theta} = \frac{\gamma_{X_2} - \gamma_{X_1}}{x_1 + x_2} \qquad (2)$$

The second derivative of the angle of pitch represents a component of the estimate of the tangential contribution of the angular dynamic acceleration. By differencing the measurements delivered by the two matched accelerometers A1,A2, the axial contribution of the dynamic acceleration disappears.

In a similar manner, it is possible to determine an estimate of the second derivative of the angle of roll as a function of the acceleration measurements delivered by the sensors A3 and A4 and of the lever arms $z_1$ and $z_2$ between the axes of the said sensors and the y axis.

Relations (3) give the expression for the said measurements of accelerations as a function of the axial component $\gamma_{d_y}$, along the y axis, of the dynamic acceleration and of the angles of pitch and of roll.

$$\gamma_{Z_1} = \gamma_{d_Y} + g \cdot \cos(\theta)\sin(\phi) - z_1 \cdot \ddot{\phi}$$

$$\gamma_{Z_2} = \gamma_{d_Y} + g \cdot \cos(\theta)\sin(\phi) + z_2 \cdot \ddot{\phi} \qquad (3)$$

By differentiating the two measurements, the common terms are eliminated and it is possible to deduce therefrom an estimate of the second derivative of the angle of roll:

$$\ddot{\phi} = \frac{\gamma_{Z_1} - \gamma_{Z_2}}{z_1 + z_2} \qquad (4)$$

Likewise, it is possible to determine an estimate of the second drift of the angle of heading as a function of the acceleration measurements delivered by the sensors A5 and A6 and of the lever arms $y_1$ and $y_2$ between the axes of the said sensors and the x axis.

Relations (5) give the expression for the said measurements of accelerations as a function of the axial component $\gamma_{d_x}$, along the x axis, of the dynamic acceleration and of the angles of pitch and of heading.

$$\gamma_{Y_1} = \gamma_{d_x} - g \cdot \sin(\theta) - y_1 \cdot \ddot{\psi}$$

$$\gamma_{Y_2} = \gamma_{d_x} - g \cdot \sin(\theta) + y_2 \cdot \ddot{\psi} \qquad (5)$$

By differentiating the two measurements, the common terms are eliminated and it is possible to deduce therefrom an estimate of the second derivative of the angle of heading:

$$\ddot{\psi} = \frac{\gamma_{Y_1} - \gamma_{Y_2}}{y_1 + y_2} \qquad (6)$$

On the basis of the second derivatives of the angles of attitude, provided by relations (2), (4) and (6), and by knowing the initial value of the angles of attitude and their angular rates, it is possible, by successive integration, to deduce therefrom the current values of the angles of attitude. If $$\vec{\dot{\Omega}}_a(t) = \begin{pmatrix} \ddot{\theta} \\ \ddot{\phi} \\ \ddot{\psi} \end{pmatrix}$$

denotes the vector of the second derivatives of the angles of attitude of the aircraft 100, a first integration makes it possible to determine the vector of the angular rates of attitude, also known to the person skilled in the art, specializing in aerial navigation systems, by the notation {p,q,r}:

$$\vec{\dot{\Omega}}_a(t) = \vec{\dot{\Omega}}_a(t_0) + \int_{t_0}^{t} \vec{\ddot{\Omega}}_a(u) du = \frac{1}{\Delta t} \begin{Bmatrix} p \\ q \\ r \end{Bmatrix}$$

In a similar manner, a second integration makes it possible to determine the vector of the angles of attitude:

$$\vec{\Omega}_a(t) = \vec{\Omega}_a(t_0) + \int_{t_0}^{t} \vec{\dot{\Omega}}_a(u) du$$

The inertial system according to the invention is notably intended to be used by a backup navigation pathway. In this respect, the initial values of the angles of attitude $\vec{\Omega}_a(t_0)$ and of their angular rates $\vec{\dot{\Omega}}_a(t_0)$ are provided by a primary navigation system.

Figure 2:
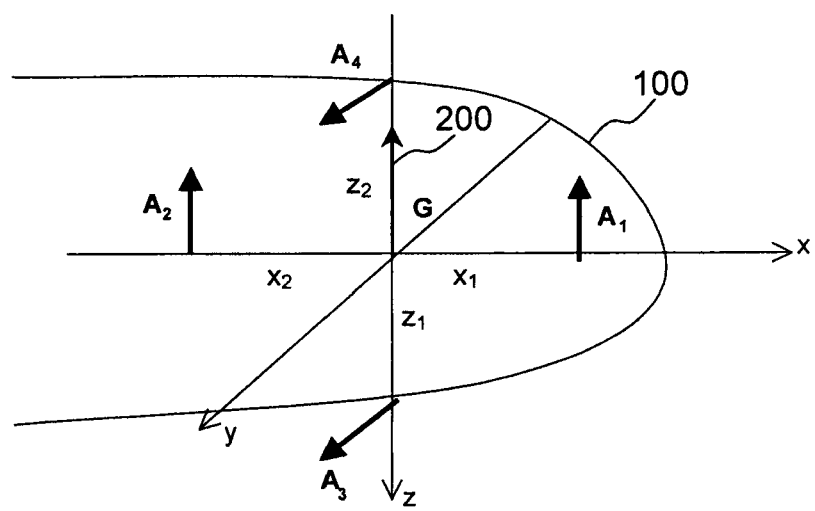

FIG. 2 shows diagrammatically, in a schematic, a variant embodiment of the inertial system according to the invention. In this variant, the third pair of accelerometers (A5,A6), serving for the determination of the angle of heading, is replaced with a gyrometer 200 whose rotation axis coincides with the z axis of the reference frame fixed with respect to the aircraft 100. The gyrometer 200 delivers an estimate of the angular rate in relation to the z axis which makes it possible to obtain, after integration, an estimate of the angle of heading. The gyrometer 200 can also be replaced with a gyroscope which delivers an estimate of the angle of heading directly. The use of a gyrometer as replacement for the third pair of accelerometers (A5,A6) makes it possible to limit the bulk on the aircraft.

In another variant embodiment of the invention, compensation of the bias impacting the measurements delivered by the accelerometers is carried out. The differences in sensitivity of the accelerometers as well as the uncertainty of alignment of their axes result globally in a differential bias between the acceleration measurements delivered by each pair of accelerometers. This bias thus impacts the measurement of the second derivative of the angles of attitude and then propagates during the two successive integrations and culminates in an angular error in the angles of attitude.

By assuming that an inertial reference system is available for the main measurement pathway and that this system delivers an unbiased estimation of the angles of attitude and of their second derivatives, it is possible to determine and correct the bias impacting the acceleration measurements delivered by the system according to the invention.

The measurements delivered by the first pair of accelerometers (A1,A2) may be expressed, by taking account of the impact of a measurement bias $\Delta_{x_1}(t)$ for the accelerometer A1 and of a measurement bias $\Delta_{x_2}(t)$ for the accelerometer A2, with the aid of the following relations (7).

$$\gamma_{x_1}(t)=\gamma_{d_z}(t)\cdot g\cdot\cos(\theta(t))\cos(\phi(t))-x_1\cdot\ddot{\theta}(t)+\Delta_{x_1}(t)$$

$$\gamma_{x_2}(t)=\gamma_{d_z}(t)-g\cdot\cos(\theta(t))\cos(\phi(t))+x_2\cdot\ddot{\theta}(t)+\Delta_{x_2}(t) \quad (7)$$

On the basis of an unbiased estimate of the angle of pitch $\hat{\theta}(t)$ and of its second derivative $\hat{\ddot{\theta}}$, which are provided for example by an inertial reference facility, the expression for the measurement biases is deduced therefrom with the aid of the following relations.

$$\Delta_{x_1}(t)=\gamma_{x_1}(t)-\gamma_{d_z}(t)+g\cdot\cos(\theta(t))\cos(\phi(t))+x_1\cdot\ddot{\theta}(t)$$

$$\Delta_{x_2}(t)=\gamma_{x_2}(t)-\gamma_{d_z}(t)+g\cdot\cos(\theta(t))\cos(\phi(t))-x_2\cdot\ddot{\theta}(t) \quad (8)$$

The instantaneous differential bias between the acceleration measurements of the two sensors A1,A2 is calculated thereafter:

$$\Delta_{x_2}(t)-\Delta_{x_1}(t)=\gamma_{x_2}(t)-\gamma_{x_1}(t)-(x_2+x_1)\cdot\hat{\ddot{\theta}} \quad (9)$$

Finally, the instantaneous differential bias is averaged over a given duration T.

$$\overline{\Delta}_{x_{21}} = \frac{1}{T}\int_0^T (\Delta_{x_2}(t) - \Delta_{x_1}(t))\,dt = \quad (10)$$

$$\frac{1}{T}\int_0^T \left(\gamma_{x_2}(t) - \gamma_{x_1}(t) - (x_2 + x_1)\cdot\hat{\ddot{\theta}}(t)\right)dt$$

The mean differential bias results in an error in the second derivative of the angle of pitch, which error is given by the relation:

$$\delta\ddot{\theta} = \frac{\overline{\Delta}_{x_{21}}}{x_1 + x_2} \quad (11)$$

The estimate of the second derivative of the angle of pitch, determined with the aid of relation (2), is compensated for the error $\delta\ddot{\theta}$.

The compensation for the measurement biases in the angles of roll and of heading is determined in the same manner on the basis of the calculation of the instantaneous and then mean differential bias between the pairs of accelerometers (A3,A4) and (A5,A6).

An advantage of the auto-calibration scheme according to the invention resides in the fact of benefiting from the main navigation system's attitude measurements so as to carry out the calibration of the errors of the accelerometers of the backup system according to the invention. In contradistinction to the known calibration solutions which are usually based on a complex calculation using a Kalman filter to permanently compensate for the measurement errors, the present invention proposes a less complex solution which may be implemented at a slower tempo, directly dependent on the duration of integration T.

By way of example, a numerical application illustrating the auto-calibration scheme according to the invention is detailed hereinafter. Assuming that the accelerometers used deliver measurements marred by measurement noise of 1 mg, then the minimum duration of integration to achieve a precision in estimating the differential bias $\overline{\Delta}_{x_{21}}$ of 0.1 mg is 100 seconds.

In the simple case of an aeroplane which exhibits a uniform rectilinear motion of speed equal to 1000 km/h and of zero angular initial position, the absolute acceleration measured in the direction considered will therefore be zero to within an error $\delta\ddot{\Omega}_a$.

This bias error $\delta\ddot{\Omega}_a$ will give rise after the first integration, to an error at the instant T in the angular rate of the aeroplane, such that:

$$\vec{\dot{\Omega}}_a(T) = \vec{\dot{\Omega}}_a(t_0) + \int_{t_0}^{t_0+T} \delta\vec{\ddot{\Omega}}_a du = \vec{\dot{\Omega}}_a(t_0) + \delta\vec{\ddot{\Omega}}_a \cdot T$$

Likewise, the second integration will propagate this bias error to the calculation of the angles of attitude:

$$\vec{\Omega}_a(T) = \vec{\Omega}_a(t_0) + \int_{t_0}^{t_0+T} \vec{\dot{\Omega}}_a(u) du = \vec{\Omega}_a(t_0) + \int_{t_0}^{t_0+T} \left(\vec{\dot{\Omega}}_a(t_0) + \delta\vec{\ddot{\Omega}}_a \cdot u\right) du$$

$$\vec{\Omega}_a(T) = \vec{\Omega}_a(t_0) + \vec{\dot{\Omega}}_a(t_0) \cdot T + \frac{1}{2}\delta\vec{\ddot{\Omega}}_a \cdot T^2$$

Thus, the bias error impacting the measurement of the angles of attitude is of the order of $$\frac{1}{2}\delta\vec{\ddot{\Omega}}_a \cdot T^2.$$

It propagates quadratically with time. By way of example, a bias error in the accelerometric measurements of the order of $1\times10^{-4}$ m·s$^{-2}$, assumed identical for all the sensors, for a lever arm distance between two matched accelerometers of the order of 1 meter induces an angular error for the aeroplane of the order of 0.18 radians or 10° after a minute. This same error reduces to 0.018 radians or 1° if the matched accelerometers are disposed 10 meters from one another. This numerical example illustrates the impact of the value of the lever arm between accelerometers of one and the same pair on the ultimate performance of attitude measurement. The more significant the latter, the better is the precision of the ultimate estimation.

The invention is now described in another embodiment making it possible to compensate, in addition to the measurement biases impacting the accelerometers, the long-term drifts in the estimates of the angles of attitude.

Such drifts may turn out to be too constraining for a backup navigation system intended to serve as relay in case of failure of the main system. To alleviate this drawback, a particular embodiment of the invention is proposed, making it possible to ensure the long-term stability of the measurements of the angles of attitude.

The gravimetric acceleration corresponding to the projection onto the vertical axis of the dynamic acceleration is determined on the basis of summing the measurement pairs delivered by the matched accelerometers and comparing this with the local gravity g to deduce therefrom an estimate of the drift errors impacting the angles of attitude.

Two typical cases are envisaged, in a first case, the speed of the aircraft is assumed to be constant and the carrier acceleration estimated by summing the pairs of measurements is directly comparable with the local gravity; in a second case, the speed of the aircraft is assumed variable and it is necessary to compensate, in all or part, for the contribution related to the axial dynamic acceleration along the x axis (direction axis of the aircraft) and optionally the y and z axes.

The errors of angular drift are thereafter used to adjust the angular measurements determined by differentiating the measurements given by the matched pairs of accelerometers.

On the basis of relations (7), it is possible to determine another estimation of the aircraft's axial acceleration (projected onto the vertical axis z) by averaging the measurements provided by the two accelerometers (A1,A2). In particular by imposing equal values $x_1 = x_2$ for the two lever arms, expression (12) is deduced therefrom:

$$\gamma_z = \frac{1}{2}(\gamma_{X_1} + \gamma_{X_2}) = \gamma_{d_Z} - g \cdot \cos(\theta) \cdot \cos(\varphi) + \frac{1}{2}(\Delta_{X_1} + \Delta_{X_2}) \quad (12)$$

In a similar manner, by imposing equal values for the lever arms of each pair of matched accelerometers, $y_1 = y_2$ and $z_1 = z_2$, the projections on the x and y axes of the acceleration of the aircraft are determined with the aid of relations (13) and (14).

$$\gamma_x = \frac{1}{2}(\gamma_{Y_1} + \gamma_{Y_2}) = \gamma_{d_X} - g \cdot \sin(\theta) + \frac{1}{2}(\Delta_{Y_1} + \Delta_{Y_2}) \quad (13)$$

$$\gamma_y = \frac{1}{2}(\gamma_{Z_1} + \gamma_{Z_2}) = \gamma_{d_Y} + g \cdot \sin(\varphi) \cdot \cos(\theta) + \frac{1}{2}(\Delta_{Z_1} + \Delta_{Z_2}) \quad (14)$$

By considering that the acceleration $\vec{\gamma} = (\gamma_x, \gamma_y, \gamma_z)$ of the aircraft at its centre of gravity G is caused solely by the terrestrial gravity $\vec{g}$, that is to say that either the speed of the aircraft is constant, or the axial dynamic acceleration $\vec{\gamma}_d$ is determined, moreover, by means external to the invention, for example anemometric measurements, and is subtracted from the measured acceleration $\vec{\gamma}$, an estimate of the axial components of the terrestrial gravity is deduced therefrom with the aid of relations (15).

$$\hat{g}_x = \gamma_x - \gamma_{d_X} = g \cdot \sin(\theta) + \frac{1}{2}(\Delta_{Y_1} + \Delta_{Y_2}) \quad (15)$$

$$\hat{g}_y = \gamma_y - \gamma_{d_Y} = g \cdot \sin(\varphi) \cdot \cos(\theta) + \frac{1}{2}(\Delta_{Z_1} + \Delta_{Z_2})$$

$$\hat{g}_z = \gamma_z - \gamma_{d_Z} = g \cdot \cos(\varphi) \cdot \cos(\theta) + \frac{1}{2}(\Delta_{X_1} + \Delta_{X_2})$$

By defining the vector $\vec{B}$ orthogonal to the trim plane defined by the angles of attitude $(\theta, \phi)$, $\vec{B} = (-\sin(\theta), \cos(\theta)\sin(\phi), \cos(\theta)\cos(\phi))$, then it is possible to estimate the error impacting the measurements on the angles of attitude as provided by the differential pathways by comparing the vectors $\vec{B}$ and $\vec{g}$ which are presumed to represent the same direction. This comparison is, for example, carried out by calculating the normed vector product of the said vectors.

$$(\delta_\varphi, \delta_\theta, *) = \quad (16)$$

$$\vec{B} \wedge \frac{\vec{g}}{\|\vec{g}\|} = (-\sin(\theta), \cos(\theta)\sin(\varphi), \cos(\theta)\cos(\varphi)) \wedge (g_x, g_y, g_z)/g$$

Thus, the angular error on the roll axis is given by relation (17)

$$\delta_\varphi = \cos(\theta)\sin(\varphi) * \frac{g_z}{g} - \cos(\theta)\cos(\varphi) * \frac{g_y}{g} \quad (17)$$

The angular error on the pitch axis is given by relation (18)

$$\delta_\theta = \sin(\theta) * \frac{g_z}{g} - \cos(\theta)\cos(\varphi) * \frac{g_x}{g} \quad (18)$$

The angular errors $\delta_\theta, \delta_\phi$ are thereafter used to compensate upstream the estimates of the angles of attitude $(\theta, \phi)$.

Figure 3:
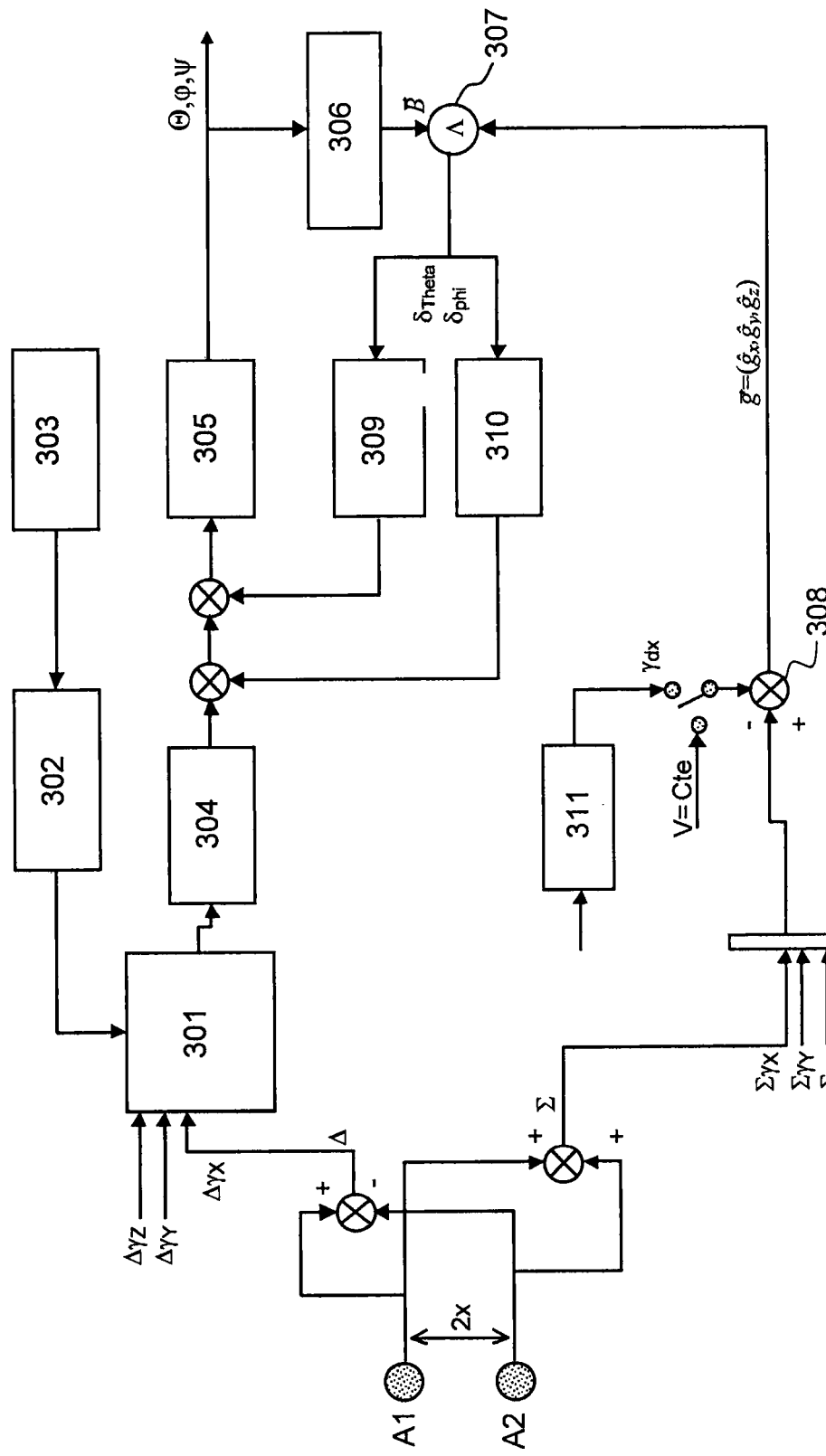
FIG. 3, a schematic illustrating the processings implemented by the invention in its various alternative embodiments.

A schematic of the global chain for estimating the angles of attitude with calibration of the accelerometers and compensation of the long-term drifts impacting the said angles is represented in FIG. 3.

On the basis of the absolute measurements delivered by the pair of accelerometers (A1,A2) separated, on the x axis, by a distance $x_1 + x_2$, a differential acceleration measurement $\Delta\gamma_x$ is produced. In a similar manner, on the basis of the pairs of accelerometers (A3,A4) and (A5,A6), the differential acceleration measurements $\Delta\gamma_y, \Delta\gamma_z$ are produced. First calculation means 301 determine, on the basis of the differential measurements $\Delta\gamma_x, \Delta\gamma_y, \Delta\gamma_z$, an estimate of the second derivatives of the angles of attitude which form an estimate of the angular acceleration $\vec{\Omega}_a(t)$ of the carrier. Alternatively, the second derivative of the angle of heading may be determined with the aid of a gyrometer as detailed previously. First integration means 304 produce, on the basis of the angular acceleration $\vec{\Omega}_a(t)$, an estimate of the vector of the angular rates or increments (p,q,r). Finally, second integration means 305 determine, on the basis of the said increments (p,q,r), an estimate of the angles of attitude.

In a first variant embodiment of the invention described previously, the accelerometers are calibrated by means of compensation of the measurement biases determined on the basis of an unbiased estimate of the angles of attitude, which is provided by an external reference 303, for example an inertial reference facility. Calculation means 302 determine the second derivative of the said unbiased estimation and then the differential bias and the mean error impacting each angle of attitude. The error is thereafter compensated directly on the estimate of the angular acceleration $\vec{\Omega}_a(t)$ determined by the means 301.

In a second variant embodiment of the invention described previously, an estimate of the acceleration of the carrier is carried out on the basis of the average, $\Sigma\gamma_x, \Sigma\gamma_y, \Sigma\gamma_z$, of the measurements delivered by each pair of matched accelerometers. The said estimates are corrected 308 by an external measurement 311 of the axial dynamic accelerations, along the x,y,z axes, when the speed of the aircraft is assumed to be variable. Advantageously, a single compensation of the component of the dynamic acceleration along the vertical axis x is sufficient for standard flight conditions. On the basis of the angles of attitude determined at the output of the integration means 305, the vector $\vec{B}$, orthogonal to the trim plane as defined by the angles of pitch and of roll, is constructed by calculation means 306. An estimate of the angular error $\delta_\theta, \delta_\phi$ impacting, in the long term, the angles of pitch and of roll is thereafter calculated as the result of the normed vector product 307 between the vector $\vec{B}$ and the vector representing the measurement of the carrier acceleration obtained on the basis of the averages $\Sigma\gamma_x, \Sigma\gamma_y, \Sigma\gamma_z$.

Finally, a control loop 309,310 is carried out to compensate for the angular errors in the estimates at the output of the first integration means 304. Means of proportional control 309 make it possible to correct the noise-related short-term errors impacting the measurements at the output of the sensors. Means of integral control 310 make it possible to correct the long-term errors giving rise to phenomena of angular drift.

An advantage of utilizing the summation of the measurements delivered by the pairs of accelerometers resides in the fact that it is thus possible to compensate for the long-term drift of the angular estimates obtained by differentiating the said measurements, which are themselves accurate in the short term.

The invention claimed is:

1. Method of determination, by an inertial system, of a measurement of the attitude of an aircraft consisting at least in determining the angle of pitch θ and/or the angle of heading ψ and/or the angle of roll φ of the said aircraft, each of the said angles of attitude being determined by successive double integration of their second derivative, the said second derivative being determined as the difference between the acceleration measurements delivered by two matched accelerometers, divided by the sum of the respective distances between the said accelerometers and the centre of gravity G of the said inertial system, the pair of accelerometers used for the determination of the angle of pitch θ being disposed on either side of the centre of gravity G along an axis x substantially merged with the longitudinal axis of the aircraft, the pair of accelerometers used for the determination of the angle of heading ψ being disposed on either side of the centre of gravity G along an axis y substantially merged with the transverse axis of the aircraft, the pair of accelerometers used for the determination of the angle of roll φ being disposed on either side of the centre of gravity G along a vertical axis z perpendicular to the plane formed by the x and y axes.

2. Method according to claim 1 furthermore consisting in compensating for the errors of calibration of the said accelerometers by correcting the second derivative of the angle(s) of attitude θ, ψ, φ, by a differential bias $\overline{A}_{x_{21}}$ divided by the sum of the respective distances between the accelerometers and the centre of gravity G of the said inertial system, the said differential bias $\overline{A}_{x_{21}}$ being determined on the basis of the integration, over a given duration T, of the difference between on the one hand, the difference between the acceleration measurements delivered by the pair of matched accelerometers and on the other hand, an unbiased estimate of the second derivative of the angle of attitude θ, ψ, φ that multiplies the sum of the said distances.

3. Method according to claim 1 wherein the measurement of the attitude of the aircraft is used as an item of backup information in support of a reference navigation system.

4. Method according to claim 3 wherein the said reference navigation system delivers the unbiased estimate of the second derivative of the angle or angles of attitude.

5. Method according to claim 1 furthermore consisting in correcting the long-term drifts impacting the said attitude measurements by determining at least one compensation $\delta_\theta$ of the angle of pitch and/or one compensation $\delta_\phi$ of the angle of roll, the said compensations $\delta_\theta, \delta_\phi$ being determined on the basis of the comparison of the vector $\vec{B}$, orthogonal to the plane of the trim as defined by the angles of pitch θ and of roll φ and of the acceleration vector $\vec{g}$ of the aircraft subject to terrestrial gravity, the said vector $\vec{g}$ being determined as the gravimetric acceleration of the aircraft at its centre of gravity G, on the basis of the average of the acceleration measurements delivered by two matched accelerometers, the respective distances between two accelerometers of one and the same pair and the centre of gravity G of the said inertial system being fixed to be mutually equal.

6. Method according to claim 5 furthermore consisting in compensating the said acceleration vector $\vec{g}$ by an estimate $\vec{\gamma}_d$ of the dynamic acceleration of the aircraft.

7. An inertial navigation system, on board an aircraft, comprising:
   a first pair of matched accelerometers disposed along an axis x substantially merged with the longitudinal axis of the aircraft, on either side of the centre of gravity G of the navigation inertial system and at a respective distance $x_1, x_2$ from the latter, the sensitive axes of the first pair of accelerometers being disposed substantially mutually parallel and perpendicular to the x axis, the inertial system furthermore comprising calculation means linked to the first pair of accelerometers and configured to determine the angle of pitch θ of the aircraft by successive double integration of their second derivative, the second derivative being determined as the difference between the acceleration measurements delivered by the first pair of accelerometers, divided by the sum of the respective distances between the accelerometers and the centre of gravity G of the inertial system.

8. The inertial navigation system according to claim 7 wherein the calculation means are further configured to compensate for the errors of calibration of the first pair of accelerometers by correcting the second derivative of the angle of pitch θ by a differential bias $\overline{A}_{x_{21}}$ divided by the sum of the respective distances between the accelerometers and the centre of gravity G of the inertial system, the differential bias $\overline{A}_{x_{21}}$ being determined on the basis of the integration, over a given duration T, of the difference between on the one hand, the difference between the acceleration measurements delivered by the first pair of accelerometers and on the other hand, an unbiased estimate of the second derivative of the angle of pitch θ that multiplies the sum of the distances.

9. The inertial navigation system according to claim 7, further comprising a second pair of matched accelerometers disposed along a vertical axis z perpendicular, at the centre of gravity G, to the x axis, on either side of the centre of gravity G and at a respective distance $z_1,z_2$ from the latter, the sensitive axes of the second pair of accelerometers being disposed substantially mutually parallel and perpendicular to the z axis wherein the calculation means is linked to the second pair of accelerometers and configured to determine the angle of roll $\phi$ of the aircraft by successive double integration of their second derivative, the second derivative being determined as the difference between the acceleration measurements delivered by the second pair of matched accelerometers, divided by the sum of the respective distances between the accelerometers and the centre of gravity G of the inertial system.

10. The inertial navigation system according to claim 9, further comprising a gyrometer disposed substantially at the centre of gravity G and oriented according to a vertical axis z perpendicular, at the centre of gravity G, to the x axis, the said gyrometer being suitable for delivering an estimate of the angle of heading $\psi$ of the aircraft.

11. The inertial navigation system according to claim 9 wherein the calculation means are further configured to compensate for the errors of calibration of the second pair of accelerometers by correcting the second derivative of the angle of roll $\phi$ by a differential bias $\overline{\Delta}_{x_{21}}$ divided by the sum of the respective distances between the accelerometers and the centre of gravity G of the inertial system, the differential bias $\overline{\Delta}_{x_{21}}$ being determined on the basis of the integration, over a given duration T, of the difference between on the one hand, the difference between the acceleration measurements delivered by the second pair of accelerometers and on the other hand, an unbiased estimate of the second derivative of the angle of roll $\phi$ that multiplies the sum of the distances.

12. The inertial navigation system according to claim 9 wherein the calculation means are further configured to correct for long-term drifts impacting the pitch angle measurements by determining at least one compensation $\delta_\theta$ of the angle of pitch and/or one compensation $\delta_\phi$ of the angle of roll, the compensations $\delta_\theta,\delta_\phi$ being determined on the basis of the comparison of the vector $\vec{B}$, orthogonal to the plane of the trim as defined by the angles of pitch $\theta$ and of roll $\phi$ and of the acceleration vector $\vec{g}$ of the aircraft subject to terrestrial gravity, the said vector $\vec{g}$ being determined as the gravimetric acceleration of the aircraft at its centre of gravity G, on the basis of the average of the acceleration measurements delivered by two matched accelerometers, the respective distances between two accelerometers of one and the same pair and the centre of gravity G of the said inertial system being fixed to be mutually equal.

13. The inertial navigation system according to claim 12 wherein the calculation means are further configured to compensate the acceleration vector $\vec{g}$ by an estimate $\vec{\gamma}_d$ of the dynamic acceleration of the aircraft.

14. The inertial navigation system according to claim 7, further comprising a third pair of matched accelerometers disposed along an axis y substantially merged with the transverse axis of the aircraft and perpendicular at the centre of gravity G, to the x axis, on either side of the centre of gravity G and at a respective distance $y_1,y_2$ from the latter, the sensitive axes of the accelerometers being disposed substantially mutually parallel and perpendicular to the y axis wherein the calculation means are linked to the third pair of accelerometers and configured to determine the angle of heading $\psi$ of the aircraft by successive double integration of their second derivative, the second derivative being determined as the difference between the acceleration measurements delivered by the third pair of accelerometers, divided by the sum of the respective distances between the third pair of accelerometers and the centre of gravity G of the inertial system.

15. The inertial navigation system according to claim 14 wherein the calculation means are further configured to compensate for the errors of calibration of the third pair of accelerometers by correcting the second derivative of the angle of heading $\psi$ of the aircraft by a differential bias $\overline{\Delta}_{x_{21}}$ divided by the sum of the respective distances between the accelerometers and the centre of gravity G of the inertial system, the differential bias $\overline{\Delta}_{x_{21}}$ being determined on the basis of the integration, over a given duration T, of the difference between on the one hand, the difference between the acceleration measurements delivered by the third pair of accelerometers and on the other hand, an unbiased estimate of the second derivative of the angle of heading $\psi$ that multiplies the sum of the distances.

16. The inertial navigation system according to claim 7 wherein it constitutes a backup navigation system in support of a primary navigation system on board the aircraft.

17. An inertial navigation system, on board an aircraft, comprising:
a first pair of matched accelerometers disposed along an axis x substantially merged with the longitudinal axis of the aircraft, on either side of the centre of gravity G of the navigation inertial system and at a respective distance $x_1,x_2$ from the latter, the sensitive axes of the first pair of accelerometers being disposed substantially mutually parallel and perpendicular to the x axis to provide a measure for determining the angle of pitch $\theta$;
a second pair of matched accelerometers disposed along a vertical axis z perpendicular, at the centre of gravity G, to the x axis, on either side of the centre of gravity G and at a respective distance $z_1,z_2$ from the latter, the sensitive axes of the second pair of accelerometers being disposed substantially mutually parallel and perpendicular to the z axis to provide a measure for determining the angle of roll $\phi$;
a third pair of matched accelerometers disposed along an axis y substantially merged with the transverse axis of the aircraft and perpendicular at the centre of gravity G, to the x axis, on either side of the centre of gravity G and at a respective distance $y_1,y_2$ from the latter, the sensitive axes of the accelerometers being disposed substantially mutually parallel and perpendicular to the y axis to provide a measure for determining the angle of heading $\psi$; and
calculation means linked to the first, second, and third pairs of accelerometers and configured to determine the angle of pitch $\theta$, the angle of roll $\phi$, and the angle of heading $\psi$ based on the measures from the first, second, and third pairs of accelerometers, respectively, by successive double integration of their second derivatives, the second derivatives being determined as the difference between the acceleration measurements delivered by the respective pairs of accelerometers, divided by the sum of the respective distances between the accelerometers and the centre of gravity G of the inertial system.

18. The inertial navigation system according to claim 17 wherein the calculation means is further configured to compensate for the errors of calibration of the first, second, and third pairs of accelerometers by correcting the second derivative of the angle(s) of attitude $\theta, \psi, \phi$, by a differential bias $\overline{\Delta}_{x_{21}}$ divided by the sum of the respective distances between the accelerometers and the centre of gravity G of the inertial system, the differential bias $\overline{\Delta}_{x_{21}}$ being determined on the basis of the integration, over a given duration T, of the difference between on the one hand, the difference between the acceleration measurements delivered by a respective pair of matched accelerometers and on the other hand, an unbiased estimate of the second derivative of the angle of attitude $\theta, \psi, \phi$ that multiplies the sum of the distances.

19. The inertial navigation system according to claim 17 wherein the calculation means is further configured to correct the long-term drifts impacting the attitude measurements by determining at least one compensation $\delta_\theta$ of the angle of pitch and/or one compensation $\delta_\phi$ of the angle of roll, the said compensations $\delta_\theta, \delta_\phi$ being determined on the basis of the comparison of the vector $\vec{B}$, orthogonal to the plane of the trim as defined by the angles of pitch $\theta$ and of roll $\phi$ and of the acceleration vector $\vec{g}$ of the aircraft subject to terrestrial gravity, the vector $\vec{g}$ being determined as the gravimetric acceleration of the aircraft at its centre of gravity G, on the basis of the average of the acceleration measurements delivered by two matched accelerometers, the respective distances between two accelerometers of one and the same pair and the centre of gravity G of the inertial system being fixed to be mutually equal.

20. The inertial navigation system according to claim 19 wherein the calculation means are further configured to compensate the acceleration vector $\vec{g}$ by an estimate $\vec{\gamma}_d$ of the dynamic acceleration of the aircraft.

* * * * *